Fig. 2.

(No Model.)　　　　　　　　　　　　　　6 Sheets—Sheet 4.
E. CRAWLEY, Sr.
MECHANISM FOR ROUNDING AND BACKING BOOKS.
No. 474,819.　　　　　　　　　Patented May 17, 1892.

Attest:
Henry Appleton
T. Smith

Inventor:
Edwin Crawley, Sr.,
per Wm. Hubbell Fisher,
Attorney.

(No Model.)  6 Sheets—Sheet 5.

E. CRAWLEY, Sr.
MECHANISM FOR ROUNDING AND BACKING BOOKS.

No. 474,819. Patented May 17, 1892.

Attest:
Henry Appleton
K. Smith

Inventor:
Edwin Crawley Sr.,
per Wm. Hubbell Fisher,
Attorney.

(No Model.) 6 Sheets—Sheet 6.

E. CRAWLEY, Sr.
MECHANISM FOR ROUNDING AND BACKING BOOKS.

No. 474,819. Patented May 17, 1892.

Attest:
Henry Appleton
K. Smith

Inventor:
Edwin Crawley, Sr.,
per Wm. Hubbell Fisher,
Attorney.

UNITED STATES PATENT OFFICE.

EDWIN CRAWLEY, SR., OF NEWPORT, KENTUCKY.

MECHANISM FOR ROUNDING AND BACKING BOOKS.

SPECIFICATION forming part of Letters Patent No. 474,819, dated May 17, 1892.

Application filed October 27, 1891. Serial No. 409,951. (No model.)

*To all whom it may concern:*

Be it known that I, EDWIN CRAWLEY, Sr., a citizen of the United States, and a resident of the city of Newport, in the county of Campbell and State of Kentucky, have invented certain new and useful Improvements in Mechanism for Rounding and Backing Books by Hand and Foot Power, of which the following is a specification.

The several features of my invention and the various advantages resulting from their use, conjointly or otherwise, will be apparent from the following description and claims.

In the accompanying drawings, forming a part of this specification, and to which reference is hereby made, Fig. 3$^a$ is a modification of the adjusting-rod. Fig. 6$^a$ represents a front elevation of the bar which supports the rear pivot of the rear toggle. Fig. 6$^b$ represents a front elevation of an angle-iron, which forms a portion of the bar shown in Fig. 6$^a$. Fig. 10$^a$ is a front view, enlarged, of the latch and of a part of the mechanism for disengaging the same. Fig. 10$^b$ is a side or edge view of the mechanism shown in Fig. 10$^a$.

The mechanism in general is supported by a suitable frame A, preferably of metal.

I will now proceed to describe the preliminary guide employed when the book is first introduced into the machine.

Figures 1, 8:
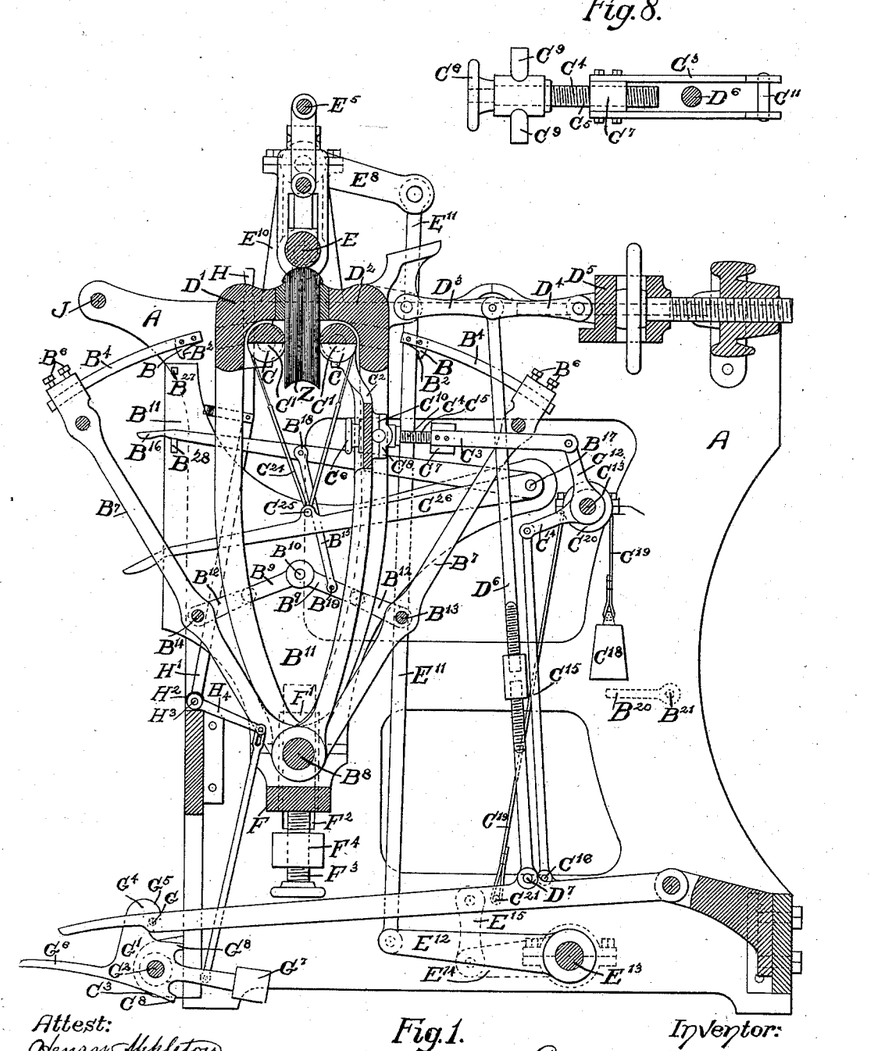
Figure 1 represents a vertical longitudinal section taken a little to the right of the longitudinal vertical center of the machine.
Fig. 8 is a top view of the link, screw, and thimble for operating the swinging carrier of the back roller and for adjusting the throw of the said carrier.
Figure 7:
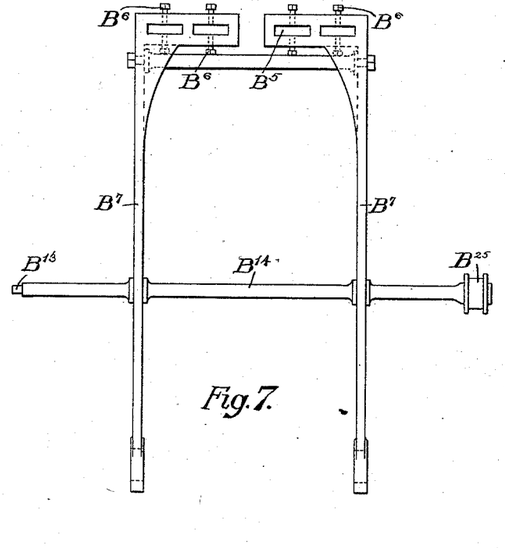
Fig. 7 represents a front elevation of the front guide-carrier.
Figures 11, 13, 14, 15, 16:
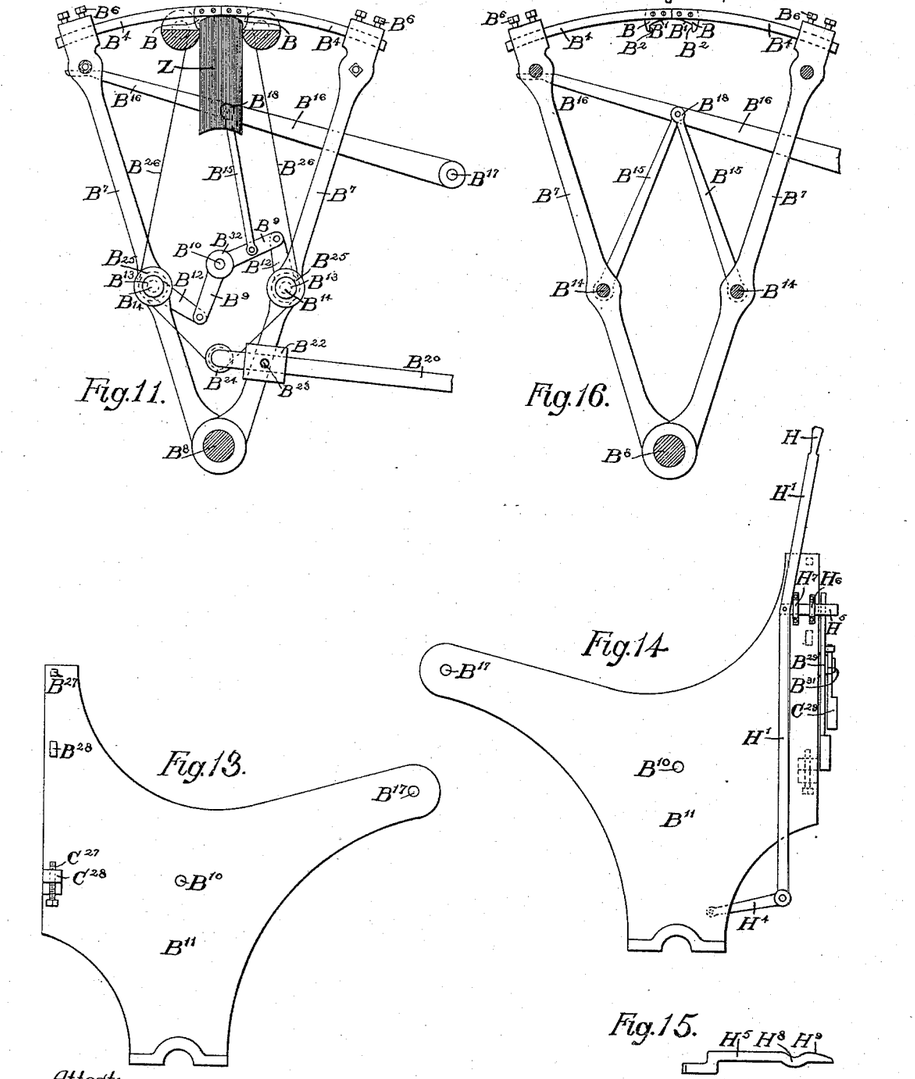
Fig. 11 is a side view of the guide, guide frames or carriers, and rounding-rollers, and mechanism for returning the rollers and frames to their first positions and for separating the guides, and also showing a book in position against the guides.
Fig. 13 represents a right-hand side view of a plate or frame-work carrying the fulcrums and stops of the hand-levers.
Fig. 14 is a left-hand side elevation of the mechanism for preventing the rounding-rollers and guides from returning to their first position and for rendering them inoperative after they have been released by the foot-lever while the book is being adjusted between the jaws. Another purpose of the mechanism shown in this figure is to permit a book to be backed by this machine without being rounded thereby.
Fig. 15 is a top view of the latch shown in Fig. 14.
Fig. 16 is a side elevation of the said guides and guide frames or carriers and of a modified form of mechanism for separating the same.
Figure 12:
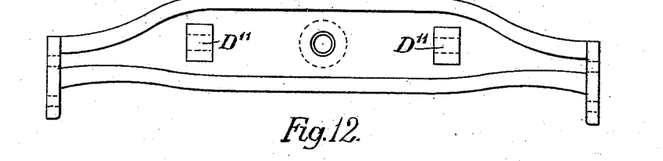
Fig. 12 is a front elevation of a brace-bar at the rear and upper end of the machine.

B B, Figs. 11 and 1, are the guides proper. Each of these guides is provided with an edge B' and a projection B$^2$. In operation the back of the book rests against the edge B', and this edge B' is curved or straight, as desired. Each guide is attached to a respective reciprocating arm B$^4$. When the two guides are brought together, as shown in Fig. 11, the distance between their respective projections B$^2$ B$^2$ is the thickness of the book which the machine is to round and back. Inasmuch as it is desirable that one machine may be employed in rounding and backing books of different sizes the guides are either exchanged for those of other sizes or may be so adjusted that their respective projections B$^2$ may be located nearer to or farther from each other. In the present illustrative instance each guide is attached to its respective arm B$^4$ by means of screws B$^3$. There are four of these guides B, and consequently two pairs, each pair working together. The arms $B^4$ on that side of the book which is toward the front of the machine are operated by the guide-carrier shown in Fig. 7, and the arms on the other side of the book are operated by guide-carriers similar to that shown in Fig. 7. These arms are connected to their respective frame-carriers in any suitable manner. The connection between the frame-carrier and the arm is preferably an adjustable one, and in the present instance it consists of the openings $B^5$ and the guide-frame carrier $B^7$ and the set-screws $B^6$, Fig. 7. The arm $B^4$ is inserted in the hole $B^5$ between opposing set-screws $B^6$. The latter are then tightened upon the arm. The frames $B^7$ oscillate on a pivotal basal shaft $B^8$. (See Figs. 11, 1, and 2.) The object of enabling these frames to be reciprocated in an oscillatory path is for reciprocating the guide-arms $B^4$ and their respective guides B.

When the guide-frames are moved toward each other, their respective guide-arms $B^4$ and the complementary halves of the guides B approach one another until the said complementary halves of the guides B are in conjunction. Thus the guides are in position for the back of the book to be inserted between the projections $B^2$ $B^2$ of the guides and the back is in position to be clamped by the rollers. When the guide-frames $B^7$ and their respective guide-arms $B^4$ and guides B are moved away from each other, opportunity is afforded for passing the book up between them for the purpose hereinafter mentioned. The preferred mechanism for reciprocally moving these frames $B^7$ $B^7$ is as follows: A compound lever $B^{32}$, having its two arms $B^9$ $B^9$, rigidly attached to the central portion, is fixed to a pivot $B^{10}$, attached to the secondary frame $B^{11}$, by which it is supported. Other objects of this secondary frame $B^{11}$ will be hereinafter mentioned. Each arm of the compound lever is pivoted to the adjacent link $B^{12}$, and the opposite end of the rear link $B^{12}$ is pivoted at $B^{13}$ to the bar $B^{14}$, fixed to the uprights of the frame $B^7$, and the other end of the forward link $B^{12}$ is likewise pivoted at a similar point on the bar $B^{14}$, connected to the front guide $B^7$. (See Fig. 7.) The guide-frames $B^7$ are moved away from each other by straightening the rear toggle-joints $B^9$ $B^{12}$. The preferred means for thus operating the toggles consist of the lever $B^{16}$ and a rod $B^{15}$, pivoted at $B^{18}$ to the said lever $B^{16}$, and at its lower end pivoted at $B^{19}$ to one of the arms $B^9$ of one of the toggles. (See Figs. 11 and 1.) Another description of means for separating the guide-frames $B^7$ is shown in Fig. 16, and is as follows: The rods $B^{15}$ $B^{15}$ are present and at one end are pivoted to the lever $B^{16}$. The lower one of these rods is pivotally connected to the forward guide-frame $B^7$, and the lower end of the other rod $B^{15}$ is pivotally connected to the rear guide-frame. The depression of hand-lever $B^{16}$ operates to move the guide-frames $B^7$ away from one another, and consequently separate the complementary halves of the guides B.

Figure 2:
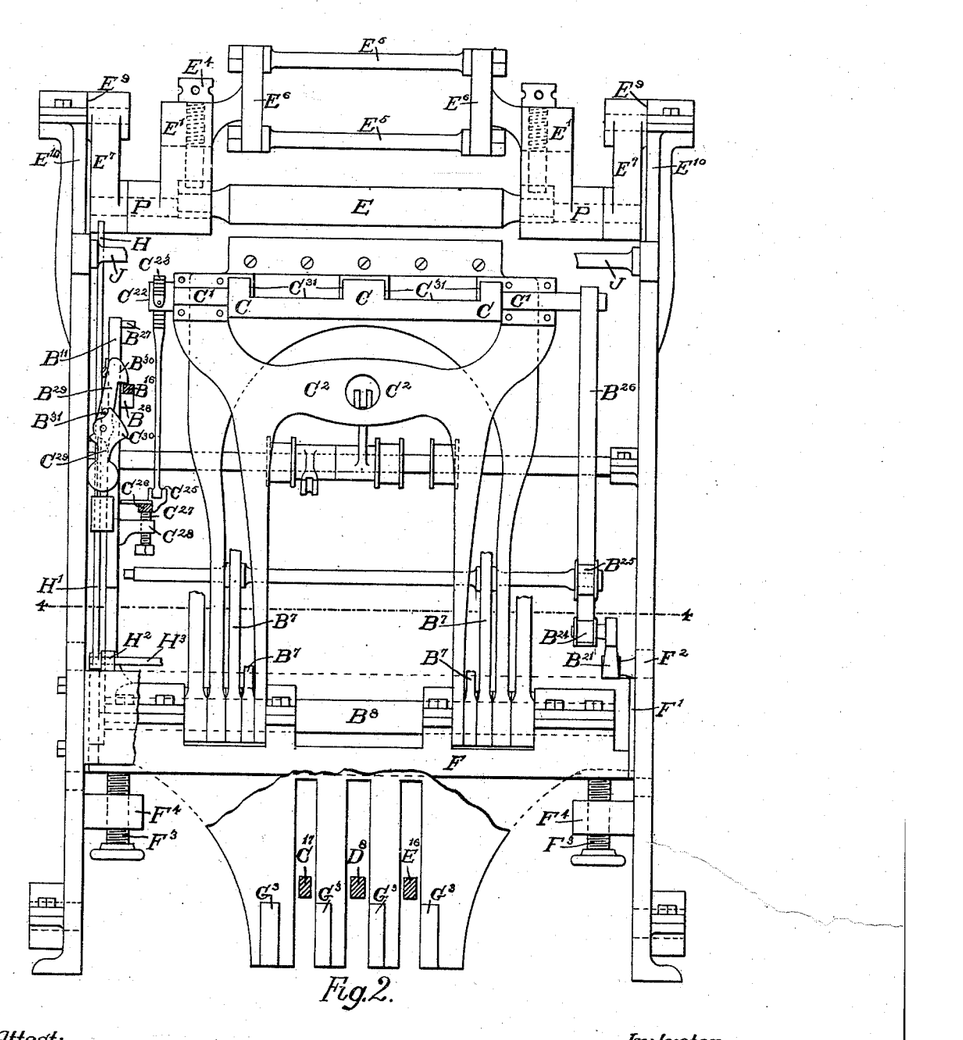
Fig. 2 represents a front view of my machine in elevation, some parts being omitted and others being shown in section, the front end of the machine being that end which is at the left hand in Fig. 1.
Figure 4:
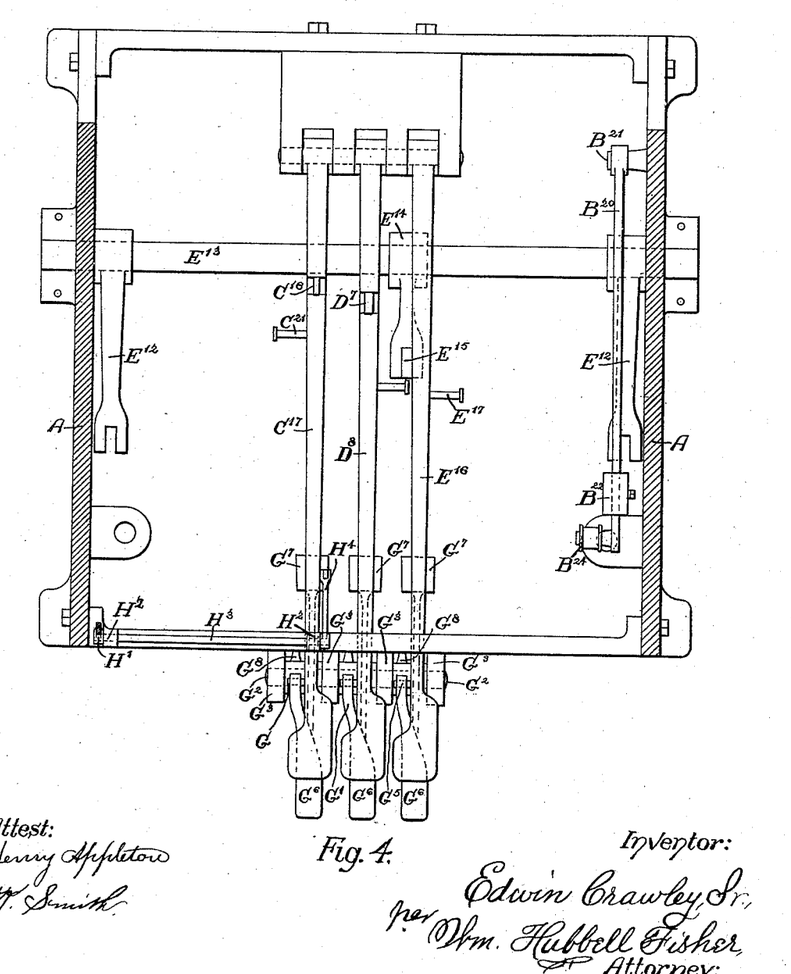
Fig. 4 is a top view of those portions of the machine which lie below a horizontal plane passing through the dotted line 4 4 of Fig. 2, excepting the bar F and mechanism connected to the said bar.
Figure 5:
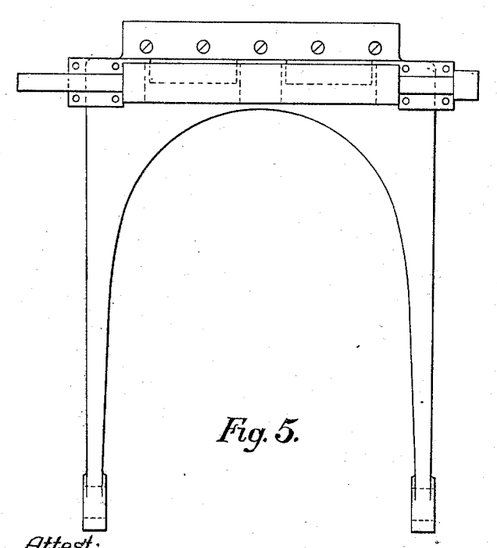
Fig. 5 represents a back view of the front jaw in elevation, showing the rounding-roller in position.

The mechanism for moving the guide-frames $B^7$ toward each other is as follows: $B^{20}$, Fig. 11, is a bar, one end of which is pivotally connected by a pivot $B^{21}$ to the frame A. This bar $B^{20}$ is weighted, preferably, by means of a sliding weight $B^{22}$, capable of being set at any point along the bar by the set-screw $B^{23}$. The free end of the bar $B^{20}$ is provided with a pulley $B^{25}$, and each of the reciprocating frames $B^7$ is likewise provided with a pulley $B^{25}$. An operating pulley cord or band $B^{26}$ passes over pulley $B^{24}$ and the pulleys $B^{25}$. One end of the cord is wound on the projecting journal of the rounding-roller C, (see Fig. 2,) and the other end of the cord or band is connected to the other rounding-roller C in like manner, as hereinafter more particularly described. Each rounding-roller rotates independently upon its own journals C'. When the catch over the lever $B^{16}$ is released, the weighted lever $B^{20}$ $B^{22}$, through the agency of the pulley-belt $B^{26}$, pressing the pulleys $B^{24}$ $B^{25}$ toward one another, causes the guide-frames $B^7$ $B^7$ to approach one another until the complementary portions of the guides B B meet. A portion of the periphery of each roller C is cut away substantially as shown in Fig. 2, and are thereby provided with recesses $C^{31}$, in order that the said rollers may at the same time be fully operative, and yet permit the guides to work in their proper position and in close proximity to the face of the jaws. The journal C' of the front rounding-roller is fixed to a portion of the front jaw D', the said roller being under the face of the jaw. The journal C' of the rear rounding-roller is fixed in and supported by the oscillating frame $C^2$, pivotally connected to the basal shaft $B^8$, the said roller being opposite and parallel to the front roller. The mechanism whereby this frame is reciprocated is as follows, viz: $C^3$ indicates a compound lever whose forward portion $C^4$ is provided with a screw-thread $C^5$, (see particularly Figs. 1 and 8,) the screw $C^4$ having a head $C^6$, whereby it may be rotated. The rear end of this screw $C^4$ screws in the part $C^7$ of the compound bar. On the screw $C^4$ between the head $C^6$ and the portion $C^7$, heretofore mentioned, is a thimble $C^8$, provided with trunnions $C^9$. The frame $C^2$ is provided with boxes $C^{10}$, into which the trunnions are secured. Thus the frame $C^2$ and its rounding-roller C will reciprocate with the compound bar $C^3$. The rear end of the compound bar $C^3$ is pivotally connected at $C^{11}$ to the free end of the lever $C^{12}$, whose opposite end is fixed on the shaft $C^{13}$. The ends of the latter are suitably journaled in the main supporting-frame A A. The shaft $C^{13}$ is operated in turn by the lever $C^{14}$. To the free end of the latter is connected one end of the connecting-rod $C^{15}$, whose other end is pivotally connected at $C^{16}$ to the foot-lever $C^{17}$. (See Figs. 1 and 4). The operation of the lever $C^{17}$ causes the rear rounding-roller C to advance forward toward the front rounding-roller C. The length of the compound rod $C^3$ is adjusted by means of the screw $C^4$ according to the thickness of the book to be clamped between the said rounding-rollers C C. The compound rod $C^3$ is made of a skeleton form, substantially as shown in Fig. 8, in order that the rod $D^6$, which operates the toggles $D^3 D^4$, may work centrally therein (and in proper position.) The compound rod $C^3$ moves in one direction—namely, in the present instance, horizontally—while the rod $D^6$ moves in a direction substantially at right angles to the compound rod $C^3$. As both the compound rod $C^3$ and the rod $D^6$ must be located centrally, space is left within the compound lever $C^3$, in order that the rod $D^6$ may have room to operate properly.

The mechanism for drawing back the rear rounding-roller C and its frame $C^2$ consists of the weight $C^{18}$, hung upon the band $C^{19}$, which latter in turn passes over a loose pulley $C^{20}$, and thence down to the lever $C^{17}$, and is connected thereto by a pin $C^{21}$ or any other suitable device. This loose pulley $C^{20}$ is journaled on the shaft $C^{13}$. When the downward pressure upon the foot-lever or treadle is released, the weight $C^{18}$ operates to draw back the rear rounding-roller C.

The rounding-rollers C C are rotated by the following mechanism: One end of a chain $C^{23}$ is fastened to the extended portion of the axis $C^{22}$ of the roller C, and is thence carried partially around the said part of the roller and at its other end connected either directly or by means of the extending strap $C^{24}$ at $C^{25}$ to the lever $C^{26}$. This latter lever is pivoted at $B^{17}$. In Fig. 1 the lever $C^{26}$ is shown as depressed. This depression of the lever rotates the rounding-rollers C and raises the book located between them to the position shown in Fig. 1. The pressure of the rollers upon the book between them is so great that the rollers will not rotate unless force be applied. Hence the book will not descend, but be held in position.

$D'$ indicates the front jaw, and $D^2$ represents the rear jaw. To the back of the rear jaw is secured the toggle $D^3 D^4$, the rear end of the said toggle being pivoted to the bar $D^5$. The toggle $D^3 D^4$ is straightened by means of the bar $D^6$, pivotally connected at $D^7$ to lever $D^8$. The depression of the said lever straightens the toggle $D^3 D^4$, substantially as shown in Fig. 1. When the toggle is straightened, the rear jaw $D^2$ is advanced toward the front jaw $D'$ and the book Z is tightly clamped between the said jaws. The rod $D^6$ is so constructed as to be adjusted in length.

Figure 3:
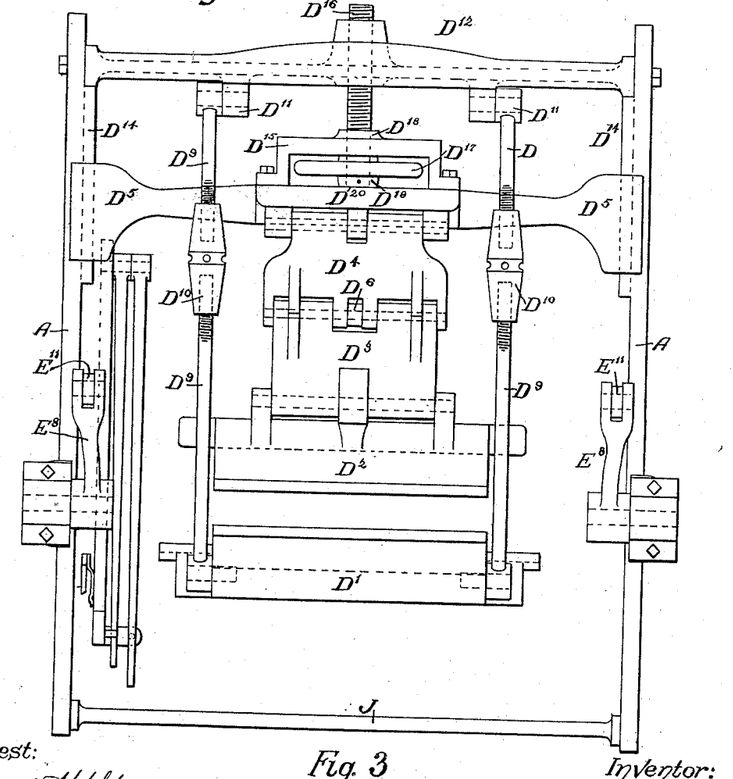
Fig. 3 is a top view of my machine, showing in relief those parts which come prominently into view, other portions below the same being omitted.
Figures 3A, 6A, 6B:
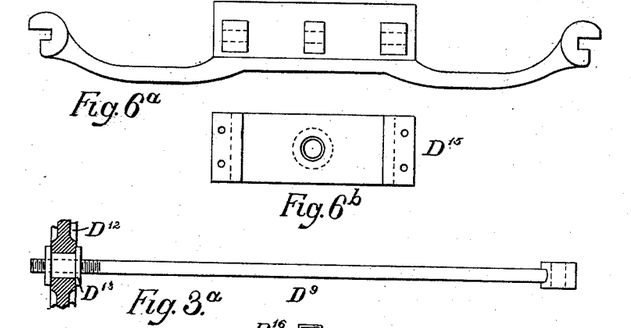

As it is necessary that books of various thicknesses should be operated upon by the machine, I provide means whereby the two jaws may be adjusted nearer together or farther from each other, and at the same time move equally in relation to the vertical plane, passing up through the center of the backing mechanism while in operative position. The mechanism therefor is as follows: The front jaw $D'$ is adjusted nearer to or farther from the vertical plane transverse to the machine and passing up through the center of the mechanism when the latter is in position by means of the side rods $D^9 D^9$. In the present illustrative instance each rod $D^9$ is rendered adjustable by means of a threaded sleeve interiorly provided in the well-known manner with a right and left hand screw-thread. The rear end of the rod $D^9$ is pivoted to its respective lug $D^{11}$, fixed to a bar $D^{12}$, in turn fixed to the frame A. When desired, the mode of rendering the rod $D^9$ adjustable in length, as shown in Fig. 3, may be employed in lieu of the right and left hand screw-thread $D^{10}$. In such event the bar $D^9$ will be of one piece and the rotatable thimble $D^{13}$ will be present in the bar $D^{12}$, having an interior screw-thread which engages the screw-thread on the adjacent end of the rod $D^9$.

The rear jaw $D^2$ is rendered adjustable by the following mechanism: The bar $D^5$ at the rear end of the toggle $D^4$ moves upon the slides $D^{14} D^{14}$, respectively, located on the upper portions of the frames A A. An angle-iron $D^{15}$ is connected to the bar $D^5$, and to this angle-iron is connected a screw-shaft $D^{16}$, whose screw-thread engages an interior screw on the interior surface of the opening through the bar $D^{12}$. This screw-shaft $D^{16}$ is rotated by a hand-wheel $D^{17}$, located in the space formed by the angle-iron. The screw-shaft is provided with a shoulder $D^{18}$, abutting against the rear side of the angle-iron and the boss $D^{19}$ of the hand-wheel, and the other end $D^{20}$ of the screw abutting against the rear side of the bar $D^5$. The rear side of the boss $D^{19}$ rests against the inside surface of the angle-iron. In this way the bar $D^5$ is compelled to move forward and backward with the screw-shaft, and the rear jaw is thereby adjusted in position.

Figure 9:
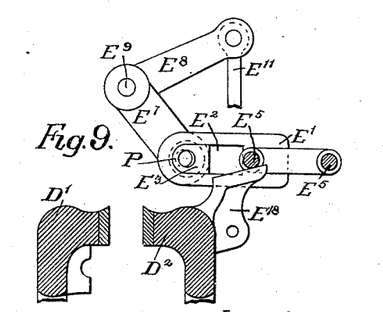
Fig. 9 represents the backing-roller in dotted line and its supporting-frame, part being broken away, in the position they occupy when not in operation, and showing one of the cross-bars of the frame resting on the stop-piece, the jaws being shown in vertical section.
Figures 10A, 10B:
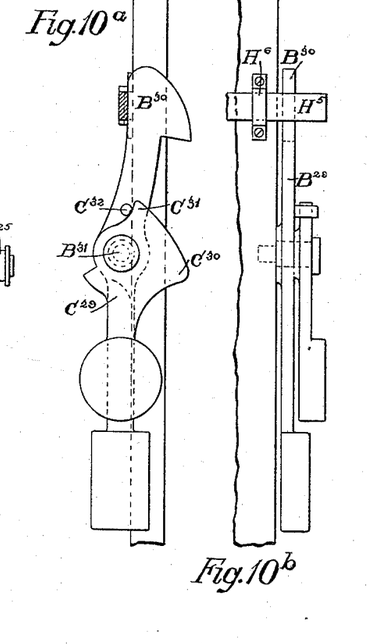

The mechanism for backing the book is as follows: E indicates the backing-roller supported at each end in a frame now to be described. $E' E'$ indicate the swinging arms each having a longitudinal slot $E^2$. In this slot is located a block $E^3$, (see Figs. 1, 2, and 9,) in which the backing-roller is journaled. This block $E^3$ is adjusted to position and supported by the screw $E^4$, whose shank is shown in dotted lines in Fig. 2 and whose head is shown in elevation. This screw engages the upper part of the arm $E'$. The swinging arms $E'$ are connected together by one or more bars $E^5 E^5$, the arms being provided with the projections or flanges $E^6$, to which the bars are connected. This swinging frame is pivoted at each end on a pivot P, fixed to arm $E^7$ of an adjacent lever $E^7 E^8$, fulcrumed at $E^9$ to a projection $E^{10}$ of the frame A.

The mechanism for throwing the backing-roller into and out of working position is as follows: The free end of the lever $E^8$ is pivotally connected to one end of rod $E^{11}$, and the other end of the latter is connected to the lever $E^{12}$. (See Figs. 1 and 4.) The levers $E^{12}$ are fixed to the shaft $E^{13}$, journaled in the frame A A. On the shaft $E^{13}$ and near its mid-length is fixed a lever $E^{14}$. The free end of this lever is connected by a link $E^{15}$ (represented by dotted lines in Fig. 1) to a foot-lever or treadle $E^{16}$. The shaft $E^{13}$ is made sufficiently small in diameter to admit of its being subjected to a torsion while the foot-treadle $E^{16}$ is depressed. When the backing-roller is in the position shown in Fig. 9, the foot-treadle $E^{16}$ is at the upper end of a vertical reciprocal path.

When it is desired to bring the backing-roller into working position, the foot-treadle $E^{16}$ is depressed, and the arm $E^8$ of the compound lever $E^7$ $E^8$ will be likewise depressed and the backing-roller E will be brought forward over the back of the book. When the roller is in the last-named position, the operator takes hold of the upper bar $E^5$ of the swinging frame and swings the latter back and forth, thereby causing the roller E to crush down and upset the back of the book. During this operation the torsion of rod $E^{13}$ permits the backing-roller E to follow the arc described by the back of the book, which arc is of a greater radius than that traveled by the inner surface of the backing-roller. The operation of backing the book being completed, the operator now releases the lever $E^{16}$ and it is immediately elevated by means of a weight, pulley, and strap similar to those described in connection with lever $C^{17}$. The lower end of the strap or pulley-band is connected to a pin or projection $E^{17}$, and the pulley over which the strap runs is journaled on the shaft $C^{13}$. The elevation of the lever $E^{16}$ and of the rods $E^{11}$ moves the roller E away from the back of the book and throws it into the position shown in Fig. 9. When the frame is released from the hand, one of the bars $E^5$ will rest on the stop or supporting piece $E^{18}$, which latter is permanently attached to the back jaw.

For securing the adjustment of the parts which hold the book and which operate thereon I provide mechanism for raising and lowering the jaws. The shaft $B^8$ is fixed to and supported at each end by a flange F', fitting into and moving vertically in a slot $F^2$. The bar is vertically supported upon the upper end of the screw $F^3$, whose thread engages a flange $F^4$, rigidly attached to and supported by the frame A. There are two of these screws, one at one side of the frame and one at the other side thereof, as shown in Fig. 2. By means of these screws the bar $B^8$, and consequently the jaws D' $D^2$, are elevated and depressed. In raising and lowering these jaws it is sometimes necessary to adjust them so that one end of each jaw shall be lower than the other. This can be accomplished by means of the screws $F^3$. Were the jaws fixed to the frame A, then when they were raised or lowered it would become necessary to readjust the stops, whereby the hand-levers are regulated in their movements. To avoid this difficulty, the fulcrums, stops, and catches of the hand-levers are fixed to the supporting plate or frame $B^{11}$, which in turn is rigidly fixed to bar F, thus causing the hand-levers with their attachments to move in unison with the guides, rounding-rollers, and jaws and making readjustment unnecessary when the jaws are changed in their position.

$B^{27}$ indicates a stop, which checks the lever $B^{16}$ in its upward movement. This stop $B^{27}$ is attached to the plate $B^{11}$.

$B^{28}$ indicates a stop which checks the lever $B^{16}$ in its downward movement. Between the stops $B^{27}$ and $B^{28}$ lies the beveled end $B^{30}$ and a latch $B^{29}$, pivoted at $B^{31}$ to the plate $B^{11}$. As the lever $B^{16}$ descends it strikes the beveled edge $B^{30}$ of said latch $B^{29}$ and throws the latch out of the way. The lever then continues to descend until it strikes the stop $B^{28}$, and the latch returning to its first position catches over the upper side of the lever $B^{16}$, holding the same firmly in position against the stop $B^{28}$ until it is released by the upward movement of the lever $C^{26}$.

$C^{27}$ indicates the stop for checking the downward movement of the lever $C^{26}$, and this stop $C^{27}$ is made vertically adjustable, in order that the throw of lever $C^{26}$ may be regulated, and thus the amount of the revolution of the rounding-rollers may be regulated. The stop $C^{27}$ consists of the screw-thread bolt engaging a lug fixed to plate $B^{11}$. The lever $C^{26}$ after being depressed is held in position by the frictional pressure of the rounding-rollers C upon the book. When the pressure on these rollers is removed, the lever $C^{26}$ will then rise by means of the pull of the belt $B^{26}$, as aforedescribed. In order that in rising it may automatically release the lever $B^{16}$, I provide the following mechanism: $C^{29}$ is a trigger, provided at $C^{30}$ with a beveled point. As the lever in rising strikes the upper edge of the beveled point $C^{30}$, it throws the said point $C^{30}$ back, and the projection $C^{31}$ strikes the stop-pin or latch $B^{29}$ and disengages latch $B^{29}$ from lever $B^{16}$ and allows the latter to rise. The foot-levers after being depressed are each automatically held down by their own devices, now to be described. Each lever is provided with a side pin G. (Shown in Fig. 4, also in dotted lines in Fig. 1.) A latch G' is pivoted on a bar $G^2$, supported by the adjacent lugs $G^3$. Each latch is provided with a hook $G^4$, having a beveled top $G^5$. The forward end of the latch is provided with the treadle $G^6$, and the rear end of the other side of the bar is provided with a weight $G^7$. In order to prevent the weight $G^7$ and the treadle $G^6$ from alternately striking the floor, I provide the latch with two stops $G^8$ $G^8$, which alternately impinge against the frame of the machine. As one of the foot-levers is depressed its pin G strikes against the beveled portion $G^5$ of the latch $G^4$, pressing back the hook. The weight $G^7$ immediately throws the hook back and over the pin G, thereby securely holding the lever down.

When the operator wishes to release the foot-lever, he depresses by his foot the treadle $G^6$ of the latch, thereby withdrawing the hook $G^4$ from engagement with the pin G and allowing the lever to rise. It will frequently happen that after the book has been rounded and at the time that the jaws are brought forward to grasp the book the operator will discover that the book is not in a position between the jaws to form the joints properly. It therefore becomes necessary to readjust the book in relation to the jaws. In order to obviate the necessity of taking the book out from between the rounding-rollers and the jaws and going over the operation of reinserting it in the machine, I provide the following mechanism, whereby the rounding-roller may be loosened by the hand in the vicinity of the jaws. The reason for this necessity for the release of the rounding-rollers by means of the hand-lever in the vicinity of the jaws is as follows: After the operator has clamped the rounding-rollers upon the book and the lever operating the rounding-roller is held down automatically by the latch G he stands upon his left foot and places his right foot upon the lever $D^8$, in order to approximate the jaws upon the book. So long as the pressure of the rollers upon the book remains he cannot adjust the book. If he takes his foot off from lever $D^8$ in order to depress the latch and hold down the lever $G^{17}$, operating the rounding-roller, the jaws will fly open. If by his right foot the operator releases the lever $C^{17}$, the rounding-rollers will open, the book will fall or be otherwise displaced, whereas by the hand mechanism just referred to the operator is enabled to keep his foot upon the jaws $D'$ $D^2$ and keep them gently pressing the book between them while he releases the pressure of the roller, and is thereby enabled to hold the book in such a position as that he can adjust it properly in relation to the jaws without the book becoming displaced in the machine.

The mechanism for enabling the rounding-rollers to be relieved of the pressure on the book by means of the hand in the vicinity of the backing-roller is as follows: H indicates the handle of the lever $H'$, located between the plate $B^{11}$ and that part of the frame A which is at the left-hand side of the machine. (See Figs. 2 and 14.) The handle H is located near the jaws and rounding-rollers. The end of this lever is rigidly connected to a shaft $H^3$, journaled at $H^2$ $H^2$ to the frame-work of the machine. Rigidly connected to that end of the shaft $H^3$ which is above the trigger $G^6$, which operates in connection with the foot-lever $C^{17}$, is an arm or lever $H^4$. The free end of this arm is attached by a link or rod to the inner end of the rear portion of the latch $G^6$, Fig. 1. As the handle $G^8$ is moved toward the front of the machine, the free end of the arm $H^4$ will be elevated and lift the rear end of the latch $G^6$, and thus disengage the hook $G^4$ from the pin $G^{17}$, leaving the latter and its lever $C^{17}$ free to rise. As the latter when released by the hand-lever $H'$ rises, it releases the pressure exerted by the rounding-rollers on the book. Then the hand-lever $C^{26}$ will rise and unless prevented would return to its first position and would prematurely release the lever $B^{16}$, and thereby return the guides B B to their first position before the proper time for their return. The hand-lever $C^{26}$ is prevented from prematurely releasing the lever $B^{16}$ by means of the following mechanism, (shown in part in Figs. $10^a$, $10^b$, and more fully in Figs. 14 and 15:) To the lever $H'$ is pivoted one end of a spring-bar $H^5$. This bar $H^5$ slides in strap-guides $H^6$ $H^7$, located on the plate $B^{11}$. The rear guide $H^7$ allows the vertical play of the bar $H^5$ in order to compensate for the elevation and depression of the plate $B^{11}$ when the jaws are moved up or down. The forward or free end of this bar $H^5$ is provided with a lateral notch $H^8$, and the extremity of the forward end portion of the said bar $H^5$ is provided with a bevel $H^9$. When the lever $H'$ is moved forward as heretofore mentioned, so that the lever $H^4$ disengages the latch G from the lever $C^{17}$, and when its forward extremity $H^9$ reaches the latch $B^{29}$, the said spring-arm $H^5$ by means of the bevel $H^9$ is deflected laterally and passes on across the edge of the latch $B^{29}$ until the recess $H^8$ is opposite the said latch $B^{29}$, at which time the spring-bar by means of its elasticity returns to its original position and a portion of the latch $B^{29}$ is received into the notch $H^8$, and the latch $B^{29}$ is thereby prevented from being moved by the ascending lever $C^{26}$. The guides will remain apart until the lever $H'$ is moved back to the first position. After this is done the hand-lever $C^{26}$ will be free to move latch $B^{29}$, and hence release the lever $B^{16}$, which in turn will return the guides to their first position.

The mode in which my invention operates in general is as follows: The various parts of the mechanism which require to be adjusted are first adjusted by the means hereinbefore described and in the manner heretofore mentioned. The machine is now in the position indicated in Fig. 11 and is in readiness for operation. A book Z is now inserted back upward against the guides B B and between the lugs $B^2$ $B^2$ of both pairs of guides. While the book is being held steadily against these guides, the foot-lever $C^{17}$ is depressed until locked, and thus the back-rounding roller C is brought against the book and clamps the latter between it and the front roller C. The hand-lever $B^{16}$ is now depressed till it strikes stop $B^{28}$. This latter movement causes the guides B B to recede from the book, leaving a passage above the book through which the latter can ascend. The hand-lever $C^{26}$ is now depressed until it reaches stop $C^{27}$. This operation causes the rollers C C to revolve in such a manner as to cause the book to ascend and at the same time to assume a rounded form. The book is now in position to be clamped by the jaws $D'$ $D^2$. The rear jaw $D^2$ is now brought forward in contact with the book by depressing foot-lever $E^{16}$, and thereby straightening the toggles $D^3$ $D^4$. In this way the jaws are caused to properly pinch the book, substantially as shown in Fig. 1. The backing-roller E is now brought into working position over the center of the book. The preferred way of accomplishing this is as follows: The roller is first lifted by hand a short distance from the rest $E^{18}$. The foot-lever $D^8$ is now depressed, which brings the backing-roller E against the back of the book and the pivot on which it swings midway between the vertical planes of the two jaws when said planes are extended upwardly above the said jaws. The backing-roller frame is now swung by hand back and forth a sufficient number of times, thereby crushing the back of the book over the jaws and forming the back of the book. Should the curve of the back of the book be of a larger radius than the curve described by the lower edge of the backing-roller E, the latter is allowed to properly move over the whole surface of the back of the book by means of the yielding of the shaft $E^{13}$ and of the intermediate levers and rods between said shaft and the roller E. The book is now rounded and backed. The frame of the rounding-roller E is now thrown rearwardly by hand, and the lever $E^{16}$ is now released. This operation carries the roller E out of the way and locates it upon the supporting-rest $E^{18}$. The rear jaw $D^2$ is now retracted from the book by releasing the lever $D^8$. The book is now grasped by hand either from above or below. The lever $C^{17}$ is then released and the rollers release their pressure upon the book. The book is now immediately removed. The rollers C C and guides B B will now automatically return to their first position.

Instead of the backing-roller a flat or curved plate may be substituted, the operation of backing a book being substantially the same whether a roller or a curved or flat plate be employed. A bar J is shown in section at the left-hand upper corner of the frame of the machine in Fig. 1. A top view of this bar is also shown in Fig. 3, and end portions of this bar are shown in elevation in Fig. 2. The functions of this bar are as follows: It operates as a brace to assist in holding the opposite sides of the frame together, and also affords a rest or brace for the body of the operator in operating the machine.

While the various features of my invention are preferably employed together, one or more of the said features may be used without the remainder, and in so far as applicable one or more of the said features may be used in connection with machines for rounding and backing books of a description other than the one herein specifically described.

What I claim as new and of my invention, and desire to secure by Letters Patent, is—

1. In a machine for rounding and backing books, the double guides B B, composed of two opposing complementary pieces, said complementary pieces being approximated when in their operative position and against which the back of the book impinges while they are in this position and separated during the subsequent operations of rounding and backing, substantially as and for the purposes specified.

2. The combination of the double guides when approximated, constituting a stop against which the back of the book impinges and otherwise separated, each guide supported on the swinging frames $B^7$, pivoted at their lower ends on a common shaft $B^8$, substantially as and for the purposes specified.

3. The combination of the double guides approximated when in operation and then constituting a guide-stop against which the back of the book rests before being carried between the jaws and at other times separated, each guide supported on the swinging frames $B^7$, pivoted at their lower ends on a common shaft $B^8$ and hand-lever $B^{16}$, and mechanism, substantially as set forth, connected to the hand-lever $B^{16}$ and guide-frames $B^7$ $B^7$ for separating the same, substantially as and for the purposes specified.

4. The combination of the double guides approximated when in operation and otherwise separated, each guide supported on the swinging frames $B^7$, pivoted at their lower ends on a common shaft $B^8$, and the toggles $B^9$ $B^{12}$ and bar $B^8$ $B^{15}$, connected thereto, and lever $B^{16}$ for operating the bar $B^{15}$, substantially as and for the purposes specified.

5. The opposing reciprocating complementary guides B B and their supporting-arms $B^4$ $B^4$, in combination with the rounding-rollers C, provided with recesses $C^{30}$ for the reception and passage of their respective guides, substantially as and for the purposes specified.

6. In a rounding and backing machine, the combination of the reciprocating guide-frames $B^7$, in combination with the rounding-rollers C, and the pulleys $B^{25}$ $B^{25}$, weight-pulley $B^{24}$, and pulley-belt $B^{26}$, the pulleys $B^{25}$ being respectively attached to their adjacent guide-frames $B^7$, substantially as and for the purposes specified.

7. In a machine for rounding and backing books, the combination of the two co-operative rounding-rollers, the rear roller supported on the swinging frame $C^2$, pivoted to a shaft, as $B^8$, substantially as and for the purposes specified.

8. In a machine for rounding and backing books, the two co-operative rounding-rollers, the rear one supported on a swinging frame, as $C^2$, pivoted to a shaft, as $B^8$, in combination with the jaws located beyond the back of the book and receiving the book after the operation of rounding has been completed, substantially as and for the purposes specified.

9. In a machine for rounding and backing books, the rear roller supported on the swinging frame $C^2$, pivoted to a shaft, as $B^8$, and the reciprocating bar $C^3$, in combination with adjusting devices for regulating the length of the bar $C^3$, substantially as and for the purposes specified.

10. In a machine for rounding and backing books, one of the rounding-rollers supported on the swinging frame $C^2$, pivoted to the shaft, and foot-lever $C^{17}$, connected to said bar by means of intermediate devices, and a latch $G'$ for locking down the lever, substantially as and for the purposes specified.

11. In a machine for rounding and backing books, one of the rounding-rollers supported on the swinging frame $C^2$, pivoted to the shaft, and foot-lever $C^{17}$, connected to said bar by means of intermediate devices, and a latch $G'$ for locking down the lever, and the hand-lever $H'$, provided with arm $H^4$, adapted to move the said latch and unlock the latter from the foot-lever $C^{17}$, substantially as and for the purposes specified.

12. In a machine for backing books, provided with jaws, substantially as $D' D^2$, a support $E^{18}$, rigidly connected to the rear jaw, in combination with the swinging backing-roller frame, substantially as and for the purposes specified.

13. In a machine for backing books, having jaws for holding the book during the operation of backing, the forward movable jaw, in combination with the rods $D^9$, connecting the jaws to a fixed support, the rods being provided with devices for regulating the length of the rods between the support and the jaw, substantially as and for the purposes specified.

14. In a machine for backing books, having jaws for holding the book during the operation of backing, the movable jaw, in combination with a device for advancing and retracting the same, and the adjusting-screw $B^{16}$, engaging a fixed support and connected with the sliding cross-bar $D^5$, substantially as and for the purposes specified.

15. In a machine for backing books, having jaws for holding the book during the operation of backing, the movable rear jaw and the toggle $D^3 D^4$, reciprocated by suitable mechanism connected at one end to the jaw and at the other end to the sliding bar $D^5$, and a device for regulating the distance between the rear end of the toggle and a given fixed support, substantially as and for the purposes specified.

16. In a machine for backing books, having jaws for holding the book during the operation of backing, the movable rear jaw and the toggle $D^3 D^4$, reciprocated by suitable mechanism connected at one end to the jaw and at the other end to the sliding bar $D^5$, screw $D^{16}$, engaging a fixed support and connected to the bar $D^5$, substantially as and for the purposes specified.

17. In a machine for backing books, the movable jaws for holding the book during the operation of backing, and the rods $D^9$, connecting the front jaw $D'$ and the rear bar $D^{12}$ by means of adjustable devices for regulating the distance between the said jaw and said bar, and the rear jaw provided with the toggle $D^3 D^4$ and the sliding bar $D^5$, connected to the rear end of the said toggle, and a device for regulating the distance of the rear jaw from the bar, said devices being connected to the said bar $D^5$ and also to the bar $D^{12}$, substantially as and for the purposes specified.

18. In a machine for backing books, the movable jaws for holding the book during the operation of backing, both connected to a common bar $D^{12}$ by means of independent devices provided with means for regulating the distance that the jaws shall occupy from the said bar $D^{12}$, and consequently from a vertical plane passing through the center of the rounding-roller when the latter is in place vertically over the book, substantially as and for the purposes specified.

19. In a rounding and backing machine having the jaws and rounding-rollers, and swinging frames for respectively supporting the said jaws and rollers, the reciprocally-adjustable shaft $B^8$, to which said swinging frames are pivoted, and the screws $F^3$ for advancing the said shaft $B^8$, substantially as and for the purposes specified.

20. In a rounding and backing machine having the jaws and rounding-rollers, and swinging frames for respectively supporting the said jaws and rollers, the reciprocally-adjustable shaft $B^8$, to which said swinging frames are pivoted, and bar F, carrying said shaft, and plate $B^{11}$, connected to said bar F, and the levers $B^{16}$ $C^{26}$ for respectively operating the rollers and the guide-frames, and the devices for locking the levers, upheld by said plate $B^{11}$, and devices for advancing the bar F at one or both ends, as desired, substantially as and for the purposes specified.

21. In a rounding and backing machine having the jaws and rounding-rollers, and swinging frames for respectively supporting the said jaws and rollers, the reciprocally-adjustable shaft $B^8$, to which said swinging frames are pivoted, and bar F, carrying said shaft, and plate $B^{11}$, connected to said bar F, and the levers $B^{16}$ $C^{26}$ for respectively operating the rollers and the guide-frames, and the devices for locking the levers, upheld by said plate $B^{11}$, and screws $F^3$ for advancing the bar F, substantially as and for the purposes specified.

22. In a machine for rounding and backing books, the lever $H'$, provided with latch-arm $H^7$, in combination with the triggers $B^{29}$ and $C^{29}$, substantially as and for the purposes specified.

23. In a machine for rounding and backing books, the lever H', provided with latch-arm H⁷, having the recess H⁸ and beveled end H⁹, in combination with the triggers B²⁹ and C²⁹, substantially as and for the purposes specified.

24. In a machine for rounding and backing books, the lever H', provided with latch-arm H⁷, in combination with the triggers B²⁹ and C²⁹, and plate B¹¹, supporting said triggers, and the guides of the latch-arm, substantially as and for the purposes specified.

25. The combination of jaws and a backing-roller, and the swinging frame swung on the pivot P, fixed to the arm E⁷ of the lever E⁷ E⁸, connected by intermediate connection to the arms E¹² and torsion-shaft E¹³, to which latter said arms E¹² are rigidly fixed, and arm or lever E¹⁴, fixed to said shaft E¹³ and operated through the agency of the lever E¹⁶, substantially as and for the purposes specified.

EDWIN CRAWLEY, Sr.

Attest:
WM. E. JONES,
K. SMITH.